Patented Oct. 9, 1951

2,570,713

UNITED STATES PATENT OFFICE 2,570,713

PREPARATION OF DIALKYLACETALS OF ACETO-ACETALDEHYDE

Henry H. Richmond, Pittsburgh, Pa., assignor to United States Rubber Company, New York, N. Y., a corporation of New Jersey No Drawing. Application July 7, 1949, Serial No. 103,529

9 Claims. (Cl. 260—594)

This invention relates to a new method for the preparation of acetoacetaldehyde dialkylacetals. More particularly it relates to such a method wherein an alkali metal hydroxymethyleneacetone is treated with a saturated aliphatic monohydric alcohol and with hydrogen chloride. Still more particularly it relates to a method of making acetoacetaldehyde diethylacetal wherein an alkali metal hydroxymethyleneacetone is treated with an ethyl alcohol solution of hydrogen chloride.

Acetoacetaldehyde dialkylacetals are valuable chemicals, being useful particularly as intermediates for the preparation of other organic chemicals. For example acetoacetaldehyde diethylacetal is an important intermediate for the preparation of sulfamerazine and of other pharmaceuticals and for the synthesis of dyestuffs since it has many of the properties of acetoacetic esters insofar as the type of reactions it undergoes is concerned. However, there has been available no simple and convenient method of preparing acetoacetaldehyde dialkylacetals.

Acetoacetaldehyde diethylacetal, although it has been mentioned in the literature, has not been adequately described, i. e., either by analysis or by physical constants. No specific method of its preparation has been described. Only indirect references to its preparation have been made. I believe that I am the first to describe a specific method of preparation of this compound together with an analysis, refractive index and boiling point.

I have now found that acetoacetaldehyde dialkylacetals may be made easily and economically by bringing together an alkali metal hydroxymethyleneacetone, an anhydrous saturated aliphatic monohydric alcohol and anhydrous hydrogen chloride. Although alkali metal hydroxymethyleneacetones, particularly sodium hydroxymethyleneacetone, are well-known chemicals, their formation having been studied to a considerable extent in the past, conversion thereof to the acetal has not been accomplished heretofore so far as I am aware. It was entirely unexpected to find that it is possible to convert an alkali metal hydroxymethyleneacetone to the acetal by simply treating it with hydrogen chloride and an aliphatic saturated monohydric alcohol since the most characteristic reaction of the alkali metal hydroxymethyleneacetones is their conversion to triacetylbenzene by traces of acid. Free acetoacetaldehyde is unknown for the reason that any attempt to obtain it from the alkali metal hydroxymethyleneacetone results in triacetylbenzene. Apparently free acetoacetaldehyde is unstable, immediately trimerizing to form triacetylbenzene. For this reason it was surprising that any acetal could be formed by the method of my invention. It was still more surprising to find that in the practice of my invention the formation of the desired acetal is rapid and that high yields of the desired product are easily obtainable in a short time.

In a typical embodiment of the present invention, a solution of dry hydrogen chloride in the dry saturated aliphatic monohydric alcohol corresponding to the acetal to be prepared is simply admixed with an alkali metal hydroxymethyleneacetone and the resulting mixture is maintained under reaction conditions until the alkali metal hydroxymethyleneacetone has been converted to the acetoacetaldehyde dialkylacetal to a suitable extent. It is often preferred to carry out the reaction at low temperatures, typically from 0° C. to 25° C. However higher reaction temperatures ranging up to the boiling point of the mixture may be employed.

The alkali metal hydroxymethyleneacetone and the alcohol and hydrogen chloride may be commingled in any suitable manner. While it is preferred to add the hydrogen chloride as a solution in the alcohol, it may be added in other ways for example as a solution in an inert solvent or diluent; alternatively, dry hydrogen chloride may be bubbled into a mixture of the alcohol and the alkali metal hydroxymethyleneacetone although manipulative difficulties and the difficulty of getting intimate contact between the gas and the solid-liquid mixture may make such a procedure undesirable. It is often preferred to effect the intermixture of the alcohol, the hydrogen chloride and the alkali metal hydroxymethyleneacetone with vigorous agitation and with cooling to such an extent as to keep the temperature from rising above 10° C. during the admixture after which the mixture, while stirring is continued, may be allowed to come to room temperature after which, if desired, it may be permitted to stand for a prolonged period of time to insure completeness of reaction.

It is often preferred to employ a molar ratio of dry hydrogen chloride to the alkali metal hydroxymethyleneacetone ranging from 1:1 to 5:1 and a molar ratio of alcohol to the alkali metal hydroxymethyleneacetone ranging from 5:1 to 30:1.

Following reaction, the acetoacetaldehyde dialkylacetal is recovered from the reaction mixture in any suitable manner. Typically, recovery thereof involves neutralization of the excess acid with a suitable acid-neutralizing agent such as sodium bicarbonate, filtration to separate the inorganic salts formed, and fractional distillation of the filtrate, the acetoacetaldehyde dialkylacetal being recovered in quite pure form as one fraction which preferably is taken over under reduced pressure to minimize decomposition.

While the present invention is described with particular reference to the use of sodium hydroxymethyleneacetone, any other alkali metal salt (or derivative, as some organic chemists prefer to designate compounds of this type) of hydroxymethyleneacetone may be used. Examples of other alkali metals which can be used in forming the salt of hydroxymethyleneacetone are potassium, lithium, rubidium and cesium. Similarly while the invention is described with particular reference to the use of ethyl alcohol which results in the formation of acetoacetaldehyde diethylacetal, it will be understood that any other saturated aliphatic monohydric alcohol may be used with the formation of the corresponding acetal. Examples of other monohydric alcohols which can be used are methyl alcohol, n-propyl alcohol, isopropyl alcohol, any of the butyl alcohols, any of the amyl alcohols, etc. Although the alcohol may have as many as 20 carbon atoms per molecule, I prefer to use the lower alkanols, viz. those having from 1 to 6 carbon atoms per molecule.

In the practice of my invention, anhydrous reactants are employed so that the reaction mixture initially is completely anhydrous, and the reaction is preferably conducted under such conditions that access of extraneous moisture is completely prevented. It will be understood however that the reaction itself results in the formation of 1 mole of water per mole of alkali metal hydroxymethyleneacetone converted to the desired acetal. If desired, provision may be made for removing this water as it is formed, for example, by azeotropic distillation of a water-containing azeotrope simultaneously with the reaction. This may be done by adding a suitable inert water-entrainer and carrying out the reaction in a distilling unit.

The process of the present invention is capable of giving yields of the desired acetal which are high enough to make the process of commercial importance. Yields of the order of 20% or more are very readily obtained. With a moderate amount of care, yields as high as 40 to 50% of acetal may be obtained. These yields are in terms of percentages of theoretical based on acetone used.

I have further found that it is possible and highly advantageous to make the alkali metal hydroxymethyleneacetone by reacting under anhydrous conditions a mixture of anhydrous acetone with anhydrous ethyl formate in the presence of a condensing agent, preferably an alkali metal alkoxide, such as sodium ethoxide, or metallic alkali metal alone, or a mixture of such alkoxide and alkali metal, the reaction preferably being effected by refluxing until the acetone is substantially completely consumed, and, without separation of the alkali metal hydroxymethyleneacetone formed from the resulting mixture, reacting the alkali metal hydroxymethyleneacetone directly with the anhydrous aliphatic saturated monohydric alcohol and anhydrous hydrogen chloride and thereby converting the alkali metal hydroxymethyleneacetone to acetoacetaldehyde dialkylacetal. In fact formation of the alkali metal hydroxymethyleneacetone and conversion thereof to acetoacetaldehyde dialkylacetal may be conducted in the same reaction vessel. Operation in the foregoing manner without separation of the intermediate alkali metal hydroxymethyleneacetone is highly advantageous since it effects a substantial saving in labor and equipment and results in lower consumption of chemicals and higher productivity.

The reactions involved in the preparation of acetoacetaldehyde diethylacetal in the manner just described may be illustrated as follows:

(1)
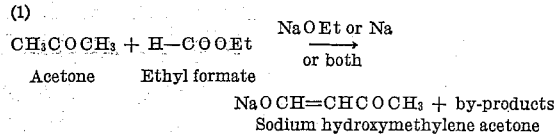

(2)
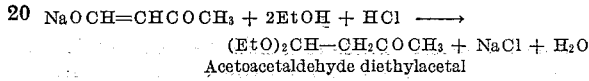

When the alkali metal hydroxymethyleneacetone is prepared in the above manner, it is quite impure. For example, when sodium hydroxymethyleneacetone is prepared by the reaction of acetone with ethyl formate in the presence of sodium ethoxide or metallic sodium or both, the resulting reaction mixture contains, in addition to sodium hydroxymethyleneacetone, considerable sodium acetate and sodium formate and perhaps sodium ethoxide. It was quite surprising to find that this impure mixture could be used directly as a source of alkali metal hydroxymethyleneacetone in the reaction with the alcohol and hydrogen chloride.

In practicing the process of my invention, it is preferable to have present both during the formation of the alkali metal hydroxymethyleneacetone and during the conversion thereof to the acetal, a considerable amount of an inert organic solvent which serves to keep the reaction mixture at the proper degree of fluidity. Examples of suitable organic solvents are diethyl ether, toluene and xylene.

The following examples illustrate my invention in more detail.

*Example 1*

To 20.0 g. (0.87 mole) of clean sodium sand which was washed with anhydrous ether and 900 cc. anhydrous ether, there was added with stirring at the reflux temperature 40.0 cc. (0.68 mole) of anhydrous ethanol. Care was taken to exclude air and moisture. The mixture was stirred and refluxed until all the alcohol had reacted forming sodium ethoxide (about four hours). This can be determined when hydrogen had ceased evolution. There was then added a solution of 25.0 cc. (0.35 mole) of anhydrous pure acetone and 40.5 cc. (0.50 mole) of anhydrous pure ethyl formate, stirring and refluxing being continued until a sample of the refluxing liquid gave little evidence of acetone present by chemical test. The reaction mixture is quite thick at this point because of the formation of sodium hydroxymethyleneacetone.

To this mixture there was added with stirring a solution of 39.5 g. (1.08 moles) of dry hydrogen chloride in 343 g. (7.46 moles) of anhydrous ethanol keeping the temperature at 5–10° C. The mixture was then stirred for five hours allowing it to warm to room temperature and then permitted to stand overnight. It was then neutralized with sodium bicarbonate and filtered to remove the inorganic salts. The filtrate was fractionally distilled to recover ether, and ethanol at atmospheric pressure and the residue was distilled at 82–87° and 12 mm. to give 25.5 g. of acetoacetaldehyde diethylacetal, $n_D^{20.5°\,C.}=1.4189$; Anal. calc. for $C_8H_{16}O_3$: C=60.1; H=10.0. Found C=60.05, 59.90; H=10.02, 10.08. This represents a yield of 45.7%. A second fraction was taken off up to 160° and 12 mm. weighing 2.3 g. which on crystallization proved to be triacetylbenzene M. P. 159°, a crude yield of 10%. There was also obtained 14.5 g. of tarry still residue.

The constitution of the acetoacetaldehyde diethylacetal was checked by its conversion to triacetylbenzene M. P. 161° through heating an aliquot of it with glacial acetic acid.

Example 2

To 20.0 g. (0.87 mole) of sodium sand prepared by agitating molten sodium under xylene and allowing to cool without stirring, and 300 cc. of dry xylene, there was added 4.0 cc. (0.067 mole) of dry ethanol. Afer thirty minutes stirring there was added a solution of 25.9 cc. (0.35 mole) dry pure acetone and 40.5 cc. (0.50 mole) dry, pure ethyl formate. The reaction mixture became thick after thirty minutes and was thinned with 300 cc. of dry xylene. The mixture was then refluxed gently for six hours with stirring. There was then added slowly a solution of 36.0 g. (0.988 mole) dry hydrogen chloride in 112 g. (2.44 moles) of dry ethanol and the mixture stirred for eight hours at room temperature. The excess acid was neutralized with sodium bicarbonate and the solid salts were removed by filtration and washed with xylene. The filtrate was concentrated under vacuum retaining the distillate. On cooling 5.7 g. of triacetylbenzene crystallized out and was filtered off; its melting point was 155°. The distillate and filtrate were combined and fractionally distilled to yield first the xylene and then 11.2 g. of acetoacetaldehyde diethylacetal B. P. 80°–85°/12 mm. The residue consisted of 13.6 g. of dark syrup. The yield of acetoacetaldehyde diethylacetal was 20% and the yield of triacetylbenzene was 24%.

Having thus described my invention, what I claim and desire to protect by Letters Patent is:

1. A method for the preparation of an acetoacetaldehyde dialkylacetal which comprises bringing together an alkali metal hydroxymethyleneacetone, an anhydrous saturated aliphatic monohydric alcohol and anhydrous hydrogen chloride.

2. A method for the preparation of acetoacetaldehyde diethylacetal which comprises bringing together an alkali metal hydroxymethyleneacetone, anhydrous ethanol and anhydrous hydrogen chloride.

3. A method for the preparation of acetoacetaldehyde diethylacetal which comprises bringing together sodium hydroxymethyleneacetone, anhydrous ethanol and anhydrous hydrogen chloride.

4. A method for the preparation of acetoacetaldehyde diethylacetal which comprises commingling sodium hydroxymethyleneacetone with a solution of dry hydrogen chloride in dry ethanol.

5. A method for the preparation of an acetoacetaldehyde dialkylacetal which comprises commingling an alkali metal hydroxymethyleneacetone, an anhydrous aliphatic saturated monohydric alcohol and anhydrous hydrogen chloride at a temperature of from 0° C. to 25° C., the molar ratio of hydrogen chloride to alkali metal hydroxymethyleneacetone being from 1:1 to 5:1 and the molar ratio of said alcohol to alkali metal hydroxymethyleneacetone being from 5:1 to 30:1.

6. A method for the preparation of an acetoacetaldehyde dialkylacetal which comprises commingling anhydrous acetone and anhydrous ethyl formate with a condensing agent selected from the group consisting of alkali metal alkoxides, metallic alkali metals and mixtures of an alkali metal alkoxide and a metallic alkali metal, and thereby forming a reaction mixture containing an alkali metal hydroxymethyleneacetone and by-products, commingling an anhydrous aliphatic saturated monohydric alcohol and anhydrous hydrogen chloride with the resulting mixture, and recovering an acetoacetaldehyde dialkylacetal from the resulting mixture.

7. A method for the preparation of acetoacetaldehyde diethylacetal which comprises commingling anhydrous acetone and anhydrous ethyl formate with an anhydrous mixture containing metallic sodium and sodium ethoxide, and thereby forming a reaction mixture containing sodium hydroxymethyleneacetone and by-products, commingling anhydrous ethanol and anhydrous hydrogen chloride with the resulting mixture, and recovering acetoacetaldehyde diethylacetal from the resulting mixture.

8. A method for the preparation of an acetoacetaldehyde dialkylacetal which comprises bringing together an alkali metal hydroxymethyleneacetone, an anhydrous saturated aliphatic monohydric alcohol and anhydrous hydrogen chloride in the presence of an inert organic solvent.

9. A method as set forth in claim 6 wherein both of said commingling steps are carried out in the presence of an insert organic solvent.

HENRY H. RICHMOND.

REFERENCES CITED

The following references are of record in the file of this patent:

UNITED STATES PATENTS

| Number | Name | Date |
|---|---|---|
| 2,421,559 | Guest et al. | June 3, 1947 |

OTHER REFERENCES

Claisen et al.: Berichte, vol. 21, pages 1145–1149 (1888); vol. 24, pages 139–140 (1891); vol. 42, pages 59–68 (1909).

Fieser et al.: "Organic Chemistry," copyright 1944 by D. C. Heath and Co., Boston, pages 218–222.